E. C. SMALL.
SUPPLEMENTAL DRIVE WHEEL FOR MOTOR VEHICLES.
APPLICATION FILED APR. 4, 1918.

1,273,684.

Patented July 23, 1918.

Inventor:
Edward C. Small,
by Hazard and Miller
Att'ys.

UNITED STATES PATENT OFFICE.

EDWARD C. SMALL, OF LOS ANGELES, CALIFORNIA.

SUPPLEMENTAL DRIVE-WHEEL FOR MOTOR-VEHICLES.

1,273,684.      Specification of Letters Patent.      Patented July 23, 1918.

Application filed April 4, 1918. Serial No. 226,717.

*To all whom it may concern:*

Be it known that I, EDWARD C. SMALL, a citizen of the United States, residing at Los Angeles, in the county of Los Angeles and State of California, have invented new and useful Improvements in Supplemental Drive-Wheels for Motor-Vehicles, of which the following is a specification.

My invention relates to supplemental drive wheels for motor vehicles and consists of the novel features herein shown, described and claimed.

Figure 1:
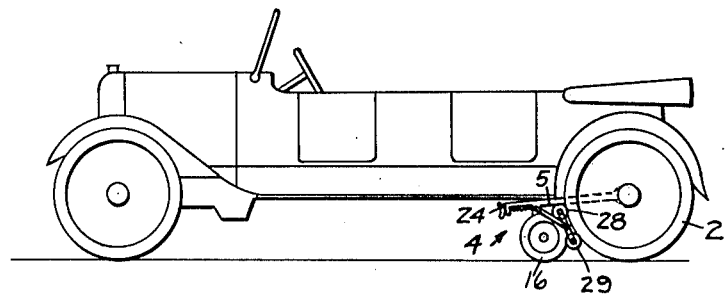
Figure 1 is a side elevation of an automobile equipped with supplemental drive wheels in accordance with the principles of my invention.
Figure 2:
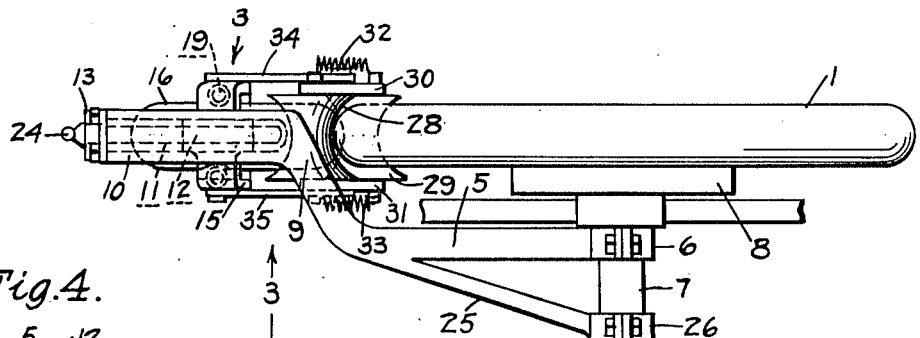
Fig. 2 is an enlarged fragmentary top plan view of the farther wheel in Fig. 1 and showing my supplemental drive wheel in position for use.
Figure 4:
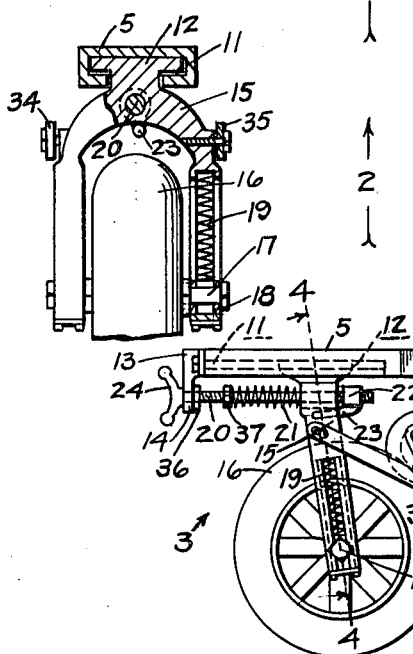
Fig. 4 is a vertical cross-sectional detail on the line 4—4 of Fig. 3.
Figure 3:
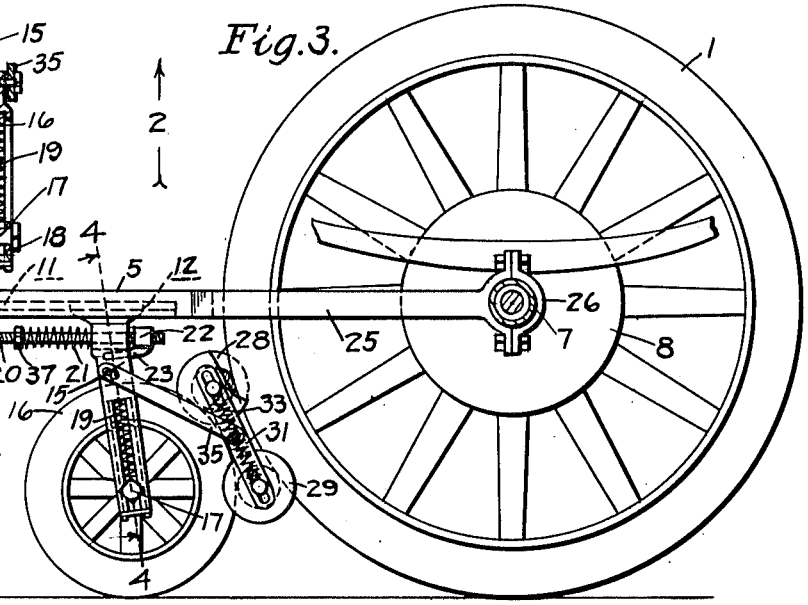
Fig. 3 is an inside elevation of the supplemental drive wheel as indicated by the arrow 3 in Fig. 2.

The rear drive wheels 1 and 2 are each provided with my supplemental drive wheel constructions 3 and 4, said constructions 3 and 4 being duplicates except that they are made right and left.

The details of the supplemental drive wheel construction 3 are as follows: The supporting arm 5 has a split clamping bearing 6 at its rear end adapted to fit upon and clamp the rear axle housing 7 just inside of the brake band construction 8, and the supporting arm 5 extends forwardly to a position beyond the periphery of the rear guide wheel 1, and the portion 9 of the arm extends outwardly and forwardly to a point in line with the drive wheel 1, and the portion 10 extends forwardly from the outer forward end of the portion 9 in a straight line with the drive wheel 1. The portion 10 has a longitudinal slide-way 11 opening downwardly and open at its forward end. The sliding head 12 fits in the slide-way 11. A bracket 13 is secured across the end of the slide-way by bolts so as to close the end of the slide-way and said bracket extends downwardly and has a bearing 14 below the slide-way. A fork 15 is formed integral with the head 12, the arms of the fork being in transverse alinement. The supplemental drive wheel 16 is mounted between the arms of the fork 15, the spindle 17 of the wheel extending through bearings 18 slidingly mounted in the arms of the fork and yieldingly held downwardly by springs 19. A rod 20 is inserted through the bearing 14 and through the head of the fork 15, there being a spring 21 upon the rod 20 against the head of the fork, and a nut 22 upon the rear end of the rod against the head of the fork, said nut having an arm 23 engaging the fork to prevent rotation of the nut and there being a wing-head 24 upon the head of the rod for operating the rod, so that by manipulating the wing-head 24 the rod 20 may be operated through the nut 22 to limit the movement of the head 12 backwardly through the slide-way 11 and the tension of the spring 21 being exerted to hold the fork 15 yieldingly against the nut 22. A brace 25 is formed integral with the forward end of the straight portion of the arm 5 and extends on an incline backwardly and inwardly and is secured to the axle housing 7 by a split clamping bearing 26 so as to hold the supplemental wheel 16 straight in line with the drive wheel 1. Grooved idlers 28 and 29 fit the periphery of the drive wheel 1 and the periphery of the supplemental wheel 16 so as to rotate the supplemental wheel by the rotation of the drive wheel. Side bars 30 and 31 connect the spindles of the wheels 28 and 29, said spindles being slidingly mounted in slots in the side bars and said spindles being yieldingly connected by springs 32 and 33, said springs tending to pull the idlers toward each other, said idlers being on opposite sides of a straight line between the axle of the drive wheel and the axle of the supplemental wheel. Links 34 and 35 connect the centers of the bars 30 and 31 to the upper ends of the arms of the fork 15, the pivot holes of the links being slotted.

As before suggested, the details of the supplemental drive construction 4 are identical with the details shown and described with reference to the supplemental drive construction 3 except that one is right-handed and the other is left-handed.

The supporting arms and braces 25 are rigidly clamped to the axle housing 7 and the springs 19 allow the supplemental drive wheels 16 to yield up and down in conformity with the unevenness of the road. The supplemental drive wheels are much smaller in diameter than the main drive wheels 1 and 2 and are intended to assist in supporting the load on a soft road and to assist in creating a traction grip upon the road for propelling the vehicle.

A stop nut 36 is placed upon the rod 20 against the rear side of the bearing 14 to hold the rod from sliding through the bearing and a spring-seat-nut 37 is mounted upon the rod 20 against the forward end of the spring 21, so that by manipulating the spring-seat-nut the tension of the spring 21 may be adjusted.

If desired, a traction belt may be placed around the drive wheels 1 and 2 and around their supplemental wheels 16, or belt or sprocket wheels may be secured to the outer sides of the drive wheels and to the outer ends of the spindles 17 to drive the supplemental wheels 16; or if desired, belt or sprocket wheels may be placed against the inner face of the drive wheels 1 and 2 around the brake bands 8, and corresponding belt or sprocket wheels fixed upon the spindle 17 so as to drive the supplemental wheels directly from the main drive wheel.

Various changes may be made in the details of construction without departing from the spirit of my invention as claimed.

I claim:

1. A supplemental drive wheel for motor vehicles, comprising a frame adapted for rigid connection to a rear axle housing, a fork slidingly connected to the frame and extending downwardly, bearings slidingly mounted in the arms of the fork, springs for holding the bearing downwardly, a wheel mounted between the arms of the fork with its spindle in the yielding bearings, and an idler engaging the periphery of the wheel and adapted to engage the periphery of the vehicle drive wheel.

2. A supplemental drive wheel for motor vehicles comprising the combination with the rear axle housing and rear drive wheel of a motor vehicle, of a frame rigidly mounted relative to the axle housing and drive wheel, a fork slidingly mounted in the frame, bearings slidingly mounted in the arms of the fork, a supplemental wheel having a spindle mounted in the sliding bearings, springs for holding the sliding bearings downwardly, idlers fitting the periphery of the drive wheel and the periphery of the supplemental wheel, and means for holding the idler wheels in place.

In testimony whereof I have signed my name to this specification.

EDWARD C. SMALL.